(12) United States Patent
El-Aini et al.

(10) Patent No.: US 7,806,410 B2
(45) Date of Patent: Oct. 5, 2010

(54) DAMPING DEVICE FOR A STATIONARY LABYRINTH SEAL

(75) Inventors: Yehia M. El-Aini, Tequesta, FL (US); William S. Mitchell, Palm Beach Garden, FL (US); Lawrence P. Roberts, North Palm Beach, FL (US); Stuart K. Montgomery, Jupiter, FL (US); Gary A. Davis, Camarillo, CA (US)

(73) Assignee: United Technologies Corporation, Hartford, CT (US)

( * ) Notice: Subject to any disclaimer, the term of this patent is extended or adjusted under 35 U.S.C. 154(b) by 468 days.

(21) Appl. No.: 11/708,287

(22) Filed: Feb. 20, 2007

(65) Prior Publication Data

US 2008/0197575 A1    Aug. 21, 2008

(51) Int. Cl.
*F16J 15/447* (2006.01)
(52) U.S. Cl. .................................. 277/413; 277/421
(58) Field of Classification Search ......... 277/411–413, 277/421; 188/378–380
See application file for complete search history.

(56) References Cited

U.S. PATENT DOCUMENTS

| | | | |
|---|---|---|---|
| 3,547,451 A * | 12/1970 | Milot et al. ................ 277/433 |
| 4,361,213 A | 11/1982 | Landis, Jr. et al. | |
| 4,441,859 A | 4/1984 | Sadler | |
| 4,721,434 A | 1/1988 | Marshall et al. | |
| 5,165,860 A | 11/1992 | Stoner et al. | |
| 5,232,344 A | 8/1993 | El-Aini | |
| 5,281,097 A | 1/1994 | Wilson et al. | |
| 5,407,321 A | 4/1995 | Rimkunas et al. | |
| 5,498,137 A | 3/1996 | El-Aini et al. | |
| 5,522,705 A | 6/1996 | Elaini et al. | |
| 5,558,497 A | 9/1996 | Kraft et al. | |
| 5,599,165 A | 2/1997 | Elaini et al. | |
| 5,724,851 A * | 3/1998 | Rivard ...................... 72/379.2 |
| 5,820,343 A | 10/1998 | Kraft et al. | |
| 6,007,068 A | 12/1999 | Dellacorte | |
| 6,042,336 A | 3/2000 | Bulgrin et al. | |
| 6,371,727 B1 | 4/2002 | Stangeland et al. | |
| 6,413,050 B1 | 7/2002 | Shimovetz | |
| 6,435,514 B1* | 8/2002 | Aksit et al. ................. 277/355 |
| 6,514,040 B2 | 2/2003 | Lewis et al. | |
| 6,575,693 B2 | 6/2003 | Pross et al. | |
| 6,676,380 B2 | 1/2004 | Davis et al. | |
| 6,682,219 B2 | 1/2004 | Alam et al. | |
| 6,685,435 B2 | 2/2004 | Davis et al. | |
| 6,719,296 B2 * | 4/2004 | Brauer et al. ............... 277/413 |
| 6,752,594 B2 | 6/2004 | Miller et al. | |
| 7,210,899 B2 * | 5/2007 | Wilson, Jr ................ 415/173.1 |

FOREIGN PATENT DOCUMENTS

SU    1377477 A  *  2/1988

OTHER PUBLICATIONS

"Nature, Causes, and Prevention of Labyrinth Air Seal Failures", Alford, J.S., *J. Aircraft*, vol. 12, No. 4, Apr. 1975, pp. 313-318.

* cited by examiner

*Primary Examiner*—Vishal Patel
(74) *Attorney, Agent, or Firm*—Kinney & Lange, P.A.

(57) ABSTRACT

A stationary labyrinth seal system includes a seal housing having an annular cavity, a plurality of damping devices, and a retaining ring. The damping devices are positioned within the annular cavity and are maintained within the annular cavity by the retaining ring.

20 Claims, 4 Drawing Sheets

US 7,806,410 B2

DAMPING DEVICE FOR A STATIONARY LABYRINTH SEAL

STATEMENT REGARDING FEDERALLY SPONSORED RESEARCH OR DEVELOPMENT

This invention was made with the support of the United States Government under Contract No. NAS8-01140 awarded by the National Aeronautics and Space Administration (NASA). The United States Government has certain rights in the invention.

BACKGROUND OF THE INVENTION

The present invention relates generally to the field of labyrinth seals. In particular, the present invention relates to damping devices for stationary labyrinth seals.

Labyrinth seals are common annular devices used in turbomachinery systems such as jet engines and turbopumps. The labyrinth seals are positioned within the system to control leakages between different cavities of the system. By minimizing leakages within the system, desired pressure drops and flow rates can be maintained, resulting in optimum performance of the system. Typically, a labyrinth seal includes a rotating component running in close proximity to a stationary component. Either the rotating component or the stationary component may include the labyrinth seal having a plurality of teeth. The individual teeth of the labyrinth seal are spaced at predetermined distances from each other along the component to throttle down the pressure of the system by a desired amount.

Labyrinth seals are often subjected to severe, vibratory environments. The vibrations may cause cracking, resulting in high cycle fatigue (HCF) failures of the labyrinth seals. The cracking may be attributed to various dynamic excitation sources, including, but not limited to: mechanical resonance due to flow path drivers or rotor dynamics, acoustic resonance caused when natural frequencies of fluid-filled cavities coincide with structural frequencies and mode shapes, and aeroelastic instability or flutter. Flutter occurs when the mechanical deflections of the labyrinth seal cause unsteady pressure loads that add energy to the labyrinth seal during vibration in an amount greater than that dissipated by the available damping in the system.

Two approaches are commonly used to prevent HCF failures: (1) modifications to the structure of the labyrinth seal to change the structural dynamic characteristics of the labyrinth seal, such as the natural frequencies and associated mode shapes of the labyrinth seal; and (2) adding mechanical damping devices to dissipate excessive vibratory energies resulting from a resonant condition or flutter instability of the seal. Combinations of (1) and (2) are also used. In the field of damping devices, split-ring dampers are commonly used in conjunction with rotating labyrinth seals. Split-ring dampers rely on the centrifugal field to provide a contact force between the damper and the seal. Energy is dissipated by the friction hysteresis cycle when the amplitude of vibration results in an elastic force in excess of the friction force.

While effective in rotating labyrinth seals, incorporating a split-ring damper in stationary labyrinth seals has proven more challenging due to the absence of centrifugal loading in stationary labyrinth seals. It would thus be beneficial to develop a damping device for use in stationary labyrinth seals.

BRIEF SUMMARY OF THE INVENTION

A stationary labyrinth seal system includes a seal housing having an annular cavity, a plurality of damping devices, and a retaining ring. The damping devices are positioned within the annular cavity and are maintained within the annular cavity by the retaining ring.

DETAILED DESCRIPTION

Figure 1:
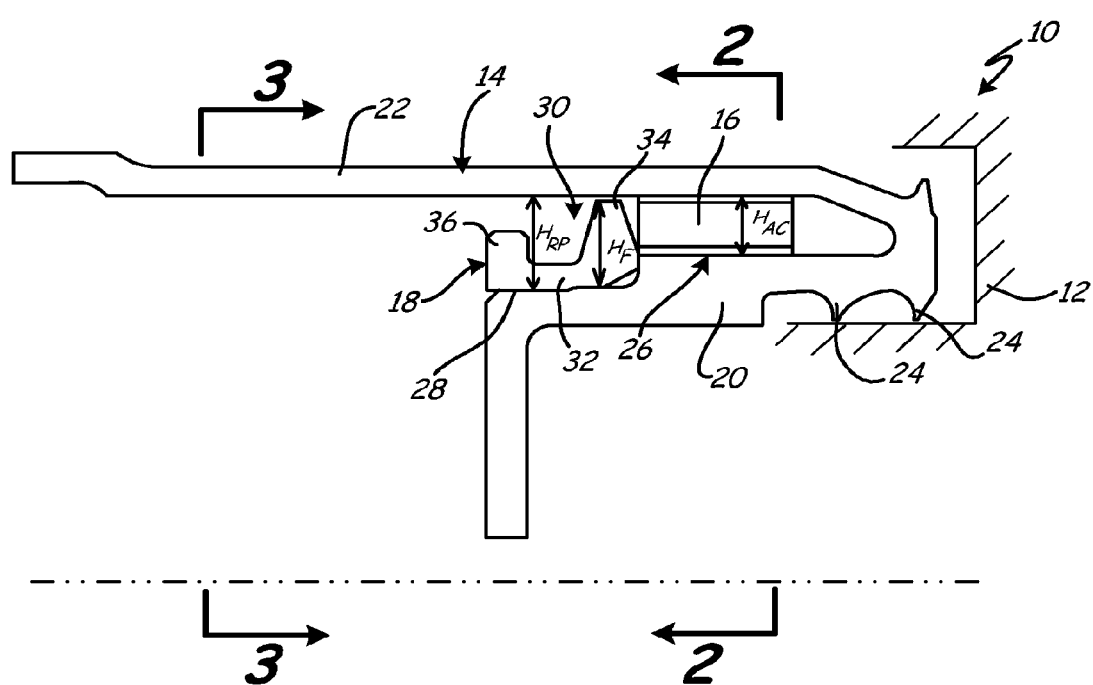
FIG. 1 is a cross-sectional view of the stationary labyrinth seal and a first embodiment of a frictional vibration damping device.

FIG. 1 shows a cross-sectional view of stationary labyrinth seal 10 positioned proximate rotating component 12. Labyrinth seal 10 generally includes seal housing 14, frictional vibration damping device 16, and retaining ring 18. In operation, seal housing 14 of labyrinth seal 10 is exposed to vibrational energy which must be dissipated to prevent cracking of seal housing 14. Damping device 16 prevents potential flutter instabilities from occurring during operation of labyrinth seal 10 by dissipating the energy entering seal housing 14. Due to the annular configuration of labyrinth seal 10, the modes of vibration are generally of a diametral traveling wave type. Thus, to maximize effectiveness, damping devices 16 are typically positioned at locations within labyrinth seal 10 corresponding to maximum modal amplitudes to ensure the largest relative motion between damping device 16 and the contact surface of labyrinth seal 10. Damping device 16 may be used with a stationary labyrinth seal 10 in any application where prevention of high cycle fatigue failures is desired, including, but not limited to: jet turbine engines and turbopumps.

Seal housing 14 generally includes inner shell 20, outer shell 22, labyrinth teeth 24, annular cavity 26, step 28, and retainer pocket 30. Labyrinth teeth 24 extend from inner shell 20 and are positioned proximate rotating component 12 such that labyrinth teeth 24 form a seal with rotating component 12. Inner shell 20 and outer shell 22 are spaced apart from one another and form annular cavity 26 where inner shell 20 and outer shell 22 join to form seal housing 14. Although FIG. 1 depicts seal housing 14 as having two labyrinth teeth 24, seal housing 14 may have any number of labyrinth teeth without departing from the intended scope of the present invention. In an exemplary embodiment, seal housing 14 is part of a space shuttle main engine high pressure liquid oxygen pump.

Annular cavity 26 is formed between inner shell 20 and outer shell 22 of seal housing 14 and has height $H_{AC}$. Annular cavity 26 may be vented by allowing a small radial gap between seal housing 14 and retaining ring 18. Immediately adjacent annular cavity 26 is step 28 formed in inner shell 20 of seal housing 14. As a result of step 28, retainer pocket 30 is formed having a height $H_{RP}$ greater than height $H_{AC}$ of annular cavity 26. Retainer pocket 30 is sized to accept retaining ring 18.

Damping device 16 is positioned within annular cavity 26 of seal housing 14 and is configured to have a sufficient preload at a particular operating condition to provide adequate energy dissipation for the modes of vibration of concern. As inner shell 20 and outer shell 22 of seal housing 14 vibrate, damping device 16 slips between the interface of seal housing 14 and damping device 16 and dissipates the vibrational energy through friction. Damping device 16 is fabricated from a material capable of withstanding the operating temperature of labyrinth seal 10 can be of various thicknesses. If fabricated too thin, frictional damping device 16 can wear out and distort with time, thereby becoming less effective.

Damping device 16 is maintained within annular cavity 26 of seal housing 14 by retaining ring 18. Retaining ring 18 includes annular ring 32 and radial flange 34, which extends radially from the inner end of annular ring 32. Radial flange 34 has a height $H_F$ approximately equal to height $H_{RP}$ of retainer pocket 30 and is positioned within retainer pocket 30 of seal housing 14. Radial flange 34 is slid into retainer pocket 30 until radial flange 34 abuts step 28 and retaining ring 18 is substantially entirely within retainer pocket 30. Because height $H_F$ of radial flange 34 is greater than height $H_{AC}$ of annular cavity 26, damping device 16 is secured within annular cavity 26 when retaining ring 18 is in place within seal housing 14. Because retainer pocket 30 is sized to accept retaining ring 18 and height $H_F$ of radial flange 34 is substantially equal to height $H_{RP}$ of retainer pocket 30, retaining ring 18 may be held by an interference fit within seal housing 14. Retaining ring 18 may also optionally include protrusion 36 extending radially from annular ring 32 along the circumference of annular ring 32 to facilitate installation and removal of retaining ring 18 from within retainer pocket 30 of seal housing 14.

In operation, inner shell 20 and outer shell 22 of seal housing 14 are designed to absorb vibrational energy within labyrinth seal 10. However, if seal housing 14 is unable to dissipate the oscillations caused by the vibrational energy, dynamic instability may occur in seal housing 14. As the instability increases, the potential for cracking also increases. Damping device 16 is thus positioned within annular cavity 26 of seal housing 14 to further dissipate any vibrational energy within labyrinth seal 10. By dissipating the excess vibrational energy from seal housing 14, the potential of damaging labyrinth seal 10 is reduced and the clearance between labyrinth teeth 24 and rotating component 12 can be controlled.

Figure 2:
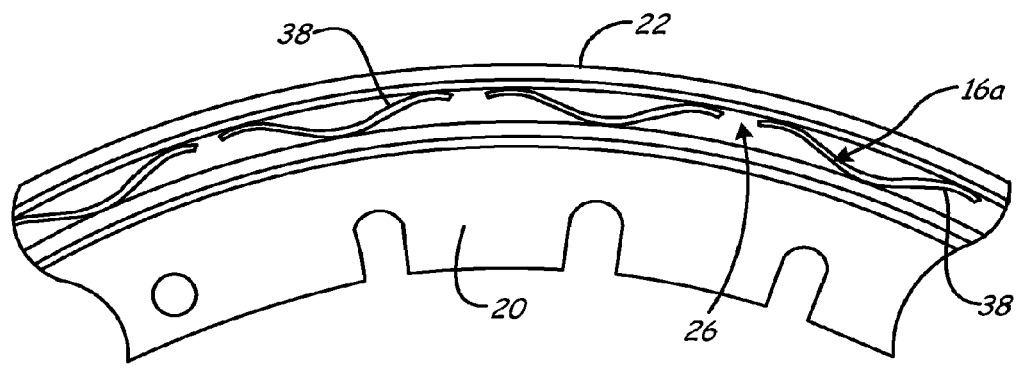
FIG. 2 is a cross-sectional view of the stationary labyrinth seal and the first embodiment of the frictional vibration damping device at line 2-2 of FIG. 1.
Figure 3:
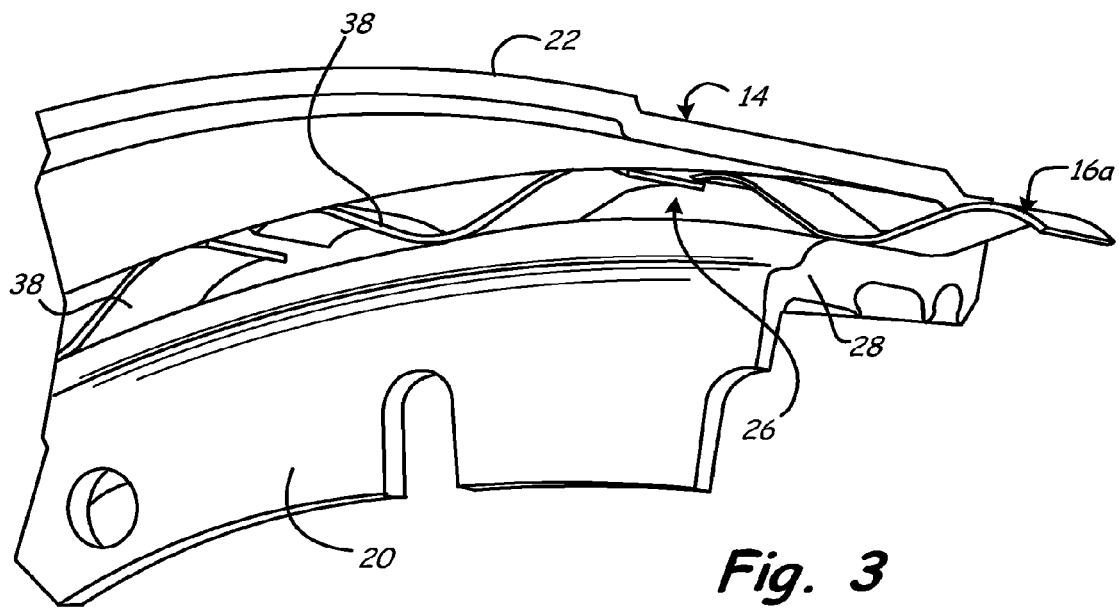
FIG. 3 is an isometric view of the stationary labyrinth seal and the first embodiment of the frictional vibration damping device at line 3-3 of FIG. 1.

FIG. 2 shows a cross-sectional view of labyrinth seal 10 at line 2-2 of FIG. 1. FIG. 3 shows an isometric view of labyrinth seal 10 at line 3-3 of FIG. 1 with retaining ring 18 removed and will be discussed in conjunction with FIG. 2. In the first embodiment of damping device 16a, damping device 16a is formed from a plurality of leaf springs 38 (damping elements) stacked circumferentially in annular cavity 26 of seal housing 14. Leaf springs 38 are positioned within annular cavity 26 and are preloaded to control the amount of energy dissipation from seal housing 14. Leaf springs 38 provide friction damping as a result of the slip motion between seal housing 14 and each individual leaf spring 38. Once leaf springs 38 are positioned within annular cavity 26, leaf springs 38 are allowed to spring back from the preloaded position. The friction occurs where each leaf spring 38 contacts seal housing 14. Leaf springs 38 are formed of a spring steel alloy capable of maintaining sufficient preload to ensure damping effectiveness at desired operating temperatures. In an exemplary embodiment, leaf springs 38 are preloaded at between approximately 10 pounds per damper and approximately 20 pounds per damper for dampers extending approximately one inch circumferentially and approximately one half inch axially.

Figure 4:
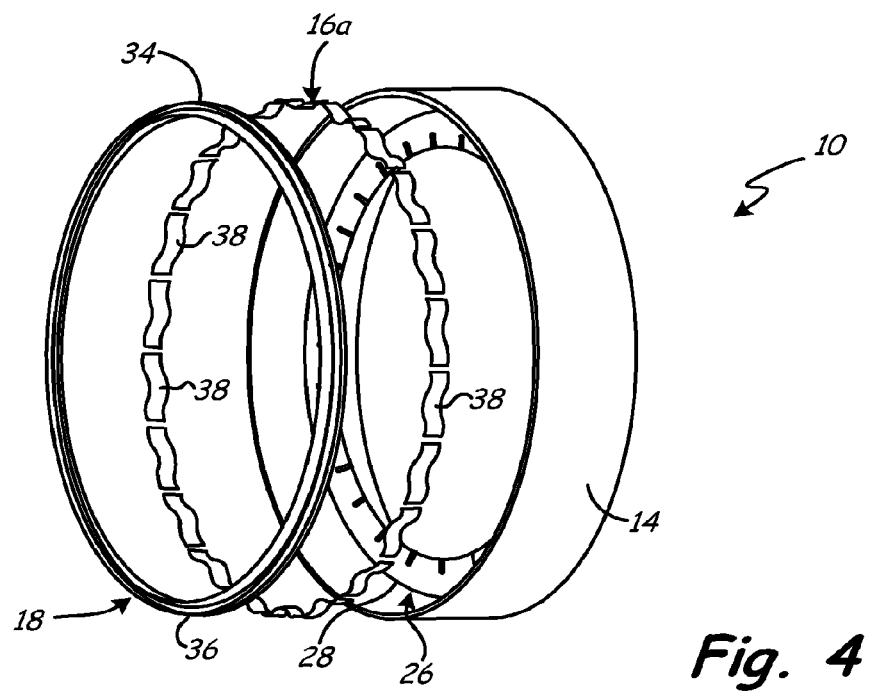
FIG. 4 is an exploded, perspective view of the stationary labyrinth seal and the first embodiment of the frictional vibration damping device.

FIG. 4 shows an exploded perspective view of labyrinth seal 10 and the first embodiment of damping device 16a. To assemble labyrinth seal 10, leaf springs 38 are first positioned within annular cavity 26 of seal housing 14. As can be seen in FIG. 4, leaf springs 38 are positioned along the entire circumference of seal housing 14. Once leaf springs 38 are in place in annular cavity 26, retaining ring 18 is positioned within retainer pocket 30 (shown in FIGS. 1 and 3) such that radial flange 34 abuts step 28 (shown in FIGS. 1 and 2) and annular ring 32 is positioned substantially entirely within retainer pocket 30. Radial flange 34 holds leaf springs 38 within annular cavity 26. Retaining ring 18 is interference fit within retainer pocket 30 and does not require additional processing to secure it in place.

Figure 5:
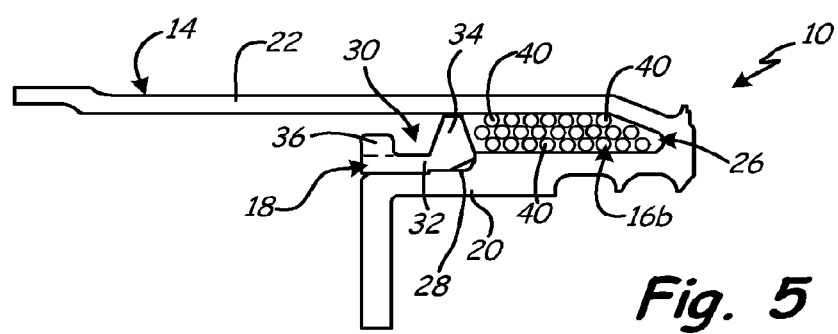
FIG. 5 is a cross-sectional view of the stationary labyrinth seal and a second embodiment of the frictional vibration damping device.
Figure 6A:
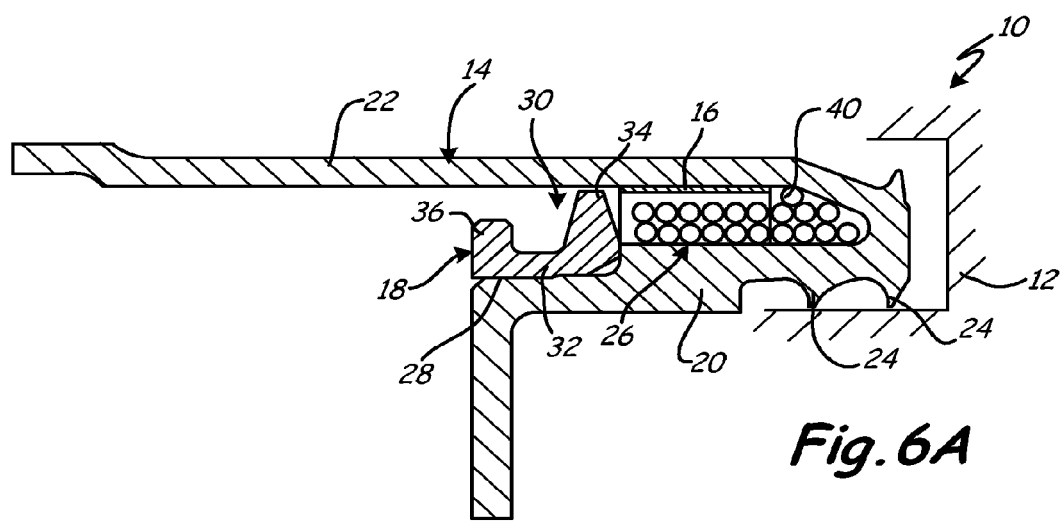
FIG. 6A is a cross sectional view of the stationary labyrinth seal and another embodiment of the frictional vibration damping device.
Figure 6B:
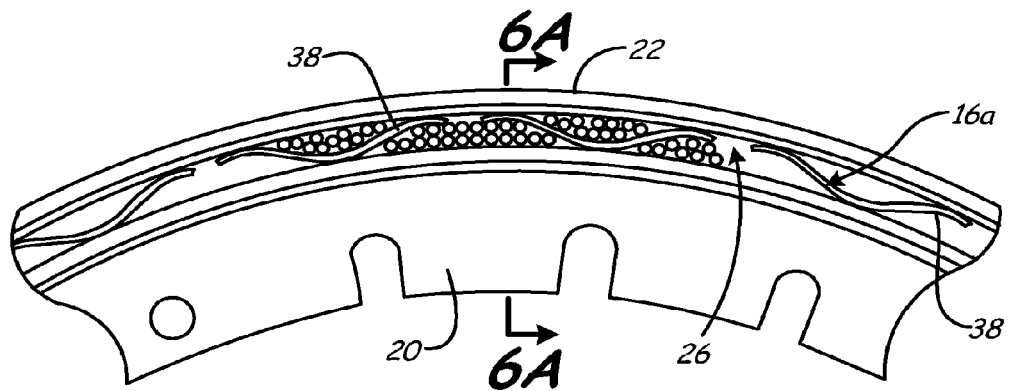
FIG. 6B is a cross sectional view of the stationary labyrinth seal and embodiment of the frictional damping device from FIG. 6A.

FIG. 5 shows a cross-sectional view of stationary labyrinth seal 10 with a second embodiment of frictional damping device 16b formed of a plurality of particles 40 (damping elements). Similar to leaf springs 38 (shown in FIGS. 2-4), particles 40 also function to dissipate energy from seal housing 14. As seal housing 14 vibrates, particles 40 slip against each other and against the walls of annular cavity 26 to dissipate energy. Damping is also achieved by dissipation due to kinetic energy of impact. Damping effectiveness is determined by a variety of parameters, including, but not limited to: the percent fill of annular cavity 26 with particles 40, the size of particles 40, the mass ratio of particles 40 to seal housing 14, the amplitude of vibration, and the frequency of vibrational mode. Particles 40 may be formed of materials including, but not limited to: tungsten, steel, and ceramic. In an exemplary embodiment, particles 40 are between approximately 0.032 inches in diameter and approximately 0.062 inches in diameter and are filled within annular cavity 26 at between approximately 75% and approximately 90% by volume. In an exemplary embodiment, the mass ratio of particles 40 to seal housing 14 is between approximately 5% and approximately 10%. For the above examples, the vibration levels were tested at forces from approximately 20 Gs to approximately 200 Gs, and the frequency range was up to approximately 6000 Hertz.

Although the above discussions describe using only either leaf springs 38 (shown in FIGS. 2-4) or particles 40 (shown in FIG. 5) as damping elements for frictional vibration damping device 16, leaf springs 38 and particles 40 may also be used in combination as damping elements of damping device 16 without departing from the intended scope of the present invention.

In order to prevent flutter instabilities within stationary labyrinth seal 10, a damping device 16, such as a plurality of leaf springs 38 or a plurality of particles 40 are first positioned within annular cavity 26 of seal housing 14. In one exemplary embodiment, leaf springs 38 are preloaded against seal housing 14 at between approximately 10 pounds per damper and approximately 20 pounds per damper for leaf springs 38 extending approximately 1 inch in circumferential length. In another exemplary embodiment, particles 40 are between approximately 0.032 inches in diameter and approximately 0.064 inches in diameter and are loaded within annular cavity 26 at between approximately 75% and approximately 90% by volume. After damping device 16 is positioned within annular cavity 26, retaining ring 18 is positioned within retainer pocket 30 such that radial flange 34 of retaining ring 18 abuts step 28 to maintain damping device 16 within annular cavity 26. Retaining ring 18 is positioned substantially entirely within retainer pocket 30 of seal housing 14. In an exemplary embodiment, retaining ring 18 is interference fit within seal housing 14.

The stationary labyrinth seal includes a seal housing having an annular cavity, a frictional vibration damping device positioned within the annular cavity, and a retaining ring. The frictional damping device dissipates vibrational energy within the seal housing to prevent potential flutter instabilities. As the labyrinth seal vibrates, the individual damping elements of the damping device slip against each other and against the surfaces of the annular cavity. The friction caused by the damping elements slipping against each other and against the surfaces of the annular cavity dissipate the vibrational energy. In one embodiment, the damping elements of the damping device includes a plurality of preloaded leaf springs. In a second embodiment, the damping elements of the damping device includes a plurality of metallic particles. The leaf springs and the particles may also be used in combination with each other as the damping elements of the damping device. The damping device is maintained within the annular cavity by the retaining ring. The frictional vibration damping device may be used in any stationary labyrinth seal where prevention of high cycle fatigue failures is desired, including, but not limited to: jet turbine engines and turbopumps.

Although the present invention has been described with reference to preferred embodiments, workers skilled in the art will recognize that changes may be made in form and detail without departing from the spirit and scope of the invention.

The invention claimed is:

1. A labyrinth seal system comprising:
   a stationary seal housing having an outer shell connected to an inner shell and spread apart from one another to form an annular cavity therebetween;
   a plurality of damping elements positioned within the annular cavity and contacting the outer shell and inner shell at locations corresponding to modal amplitudes of diametrical traveling waves to dissipate a vibration energy transmitted through the outer shell and inner shell;
   a retaining ring attached on the inner shell within the annular cavity; and
   labyrinth teeth extending from at least one of the inner shell and outer shell to proximate a rotating component to form a seal therewith.

2. The labyrinth seal system of claim 1, wherein the damping elements comprise leaf springs.

3. The labyrinth seal system of claim 2, wherein each of the damping elements has a circumferential length of about 1 inch and is preloaded at between about 10 pounds per damper and between about 20 pounds per damper.

4. The labyrinth seal system of claim 2, wherein the damping elements are formed of a steel alloy.

5. The labyrinth seal system of claim 1, wherein the damping elements comprise a plurality of particles which slip against each other and against walls of the annular cavity to dissipate the vibration energy.

6. The labyrinth seal system of claim 5, wherein the particles are selected from the group consisting of: tungsten particles and steel particles.

7. The labyrinth seal system of claim 5, wherein the particles are between about 0.032 inches in diameter and about 0.062 inches in diameter and are loaded within the annular cavity at between about 75% and about 90% by volume.

8. The labyrinth seal system of claim 1, wherein the damping elements comprise leaf springs and particles.

9. A labyrinth seal system comprising:
   a stationary seal structure having an inner shell connected to an outer shell and spaced apart to form a cavity therebetween;
   a frictional vibration damping device positioned within the cavity and contacting the outer shell and inner shell at locations corresponding to modal amplitudes of diametrical traveling waves to dissipate a vibration energy transmitted through the outer shell and inner shell, wherein the frictional vibration damping device comprises at least one of a leaf spring and a plurality of metallic particles;
   a retaining ring attached on the inner shell that maintain the frictional vibration damping device within the cavity; and
   labyrinth teeth extending from the inner shell to proximate a rotating component to form a seal therewith.

10. The labyrinth seal system of claim 9, wherein the frictional vibration damping device comprises a plurality of preloaded leaf springs.

11. The labyrinth seal system of claim 10, wherein each of the preloaded leaf springs has a circumferential length of about 1 inch.

12. The labyrinth seal system of claim 9, wherein the frictional vibration damping device comprises a plurality of particles which slip against each other and against walls of the cavity to dissipate the vibration energy, the particles being selected from the group consisting of: tungsten particles and steel particles.

13. The labyrinth seal system of claim 12, wherein the particles are between about 0.032 inches in diameter and about 0.062 inches in diameter.

14. The labyrinth seal system of claim 12, wherein the particles are loaded within the cavity at between about 75% and about 90% by volume.

15. A method of preventing flutter instabilities within a labyrinth seal system, the method comprising:
   providing a labyrinth seal with a stationary seal housing that has an outer shell connected to an inner shell and spaced apart to form an annular cavity therebetween, at least one of the outer shell and the inner shell includes labyrinth teeth which extend to proximate a rotating component to form a seal therewith;
   positioning a frictional vibration damping device within the annular cavity of the stationary seal housing contacting both the outer shell and inner shell at locations corresponding to modal amplitudes of diametrical traveling waves, to dissipate a vibration energy transmitted through the outer shell and inner shell within the stationary seal housing; and
   positioning a retaining ring within a retainer pocket on the inner shell that retain the frictional vibration damping device within the annular cavity.

16. The method of claim 15, wherein positioning the frictional vibration damping device within the annular cavity comprises positioning a plurality of leaf springs within the annular cavity.

17. The method of claim 16, wherein each of the plurality of leaf springs are preloaded.

18. The method of claim 15, wherein positioning the frictional vibration damping device within the annular cavity comprises positioning a plurality of particles within the annular cavity which slip against each other and against walls of the annular cavity to dissipate the vibration energy.

19. The method of claim 18, wherein the particles are between about 0.032 inches in diameter and about 0.062 inches in diameter.

20. The method of claim 18, wherein the particles are loaded into the annular cavity at between about 70% and about 95% by volume.

* * * * *